April 14, 1970 P. HESSER ET AL 3,506,939

MAGNET OPERATED PROGRAM DEVICE

Filed Jan. 26, 1967 2 Sheets-Sheet 1

INVENTORS
Paul Hesser, Erich Leinauer
and Gerhard Widl
by
Michael S. Striker
Attorney

MAGNET OPERATED PROGRAM DEVICE

Filed Jan. 26, 1967 2 Sheets-Sheet 2

INVENTORS
Paul Hesser, Erich Leimann and Gerhard Wille
by Michael S. Striker
Attorney

United States Patent Office 3,506,939
Patented Apr. 14, 1970

3,506,939
MAGNET OPERATED PROGRAM DEVICE

Paul Hesser, Heutigsheim, Erich Leinauer, Ludwigsburg-Eglosheim, and Gerhard Widl, Ditzingen, Germany, assignors to Robert Bosch GmbH, Stuttgart, Germany

Filed Jan. 26, 1967, Ser. No. 611,876
Claims priority, application Germany, Feb. 4, 1966, B 85,672
Int. Cl. H01h *9/02*
U.S. Cl. 335—206 4 Claims

ABSTRACT OF THE DISCLOSURE

A program device for programmable working machines whose reader comprises an array of envelopes each accommodating an electric switch which is closed when placed into a suitable magnetic field. The information storing device comprises one or more cards with arrays of permanent magnets thereon. When a card is properly inserted into or placed onto the reader, each magnet effects closing of a switch. The magnets and the envelopes of the switches are embedded in layers of synthetic plastic material to protect them against moisture, dust or other foreign matter.

BACKGROUND OF THE INVENTION

The present invention relates to program devices in general, and more particularly to improvements in program devices for machine tools or other types of programmable working machines wherein the information is stored on storing devices in the form of tapes or cards.

In presently known program devices which utilize tapes or cards, information is stored in the form of holes whose presence or absence is detected by brushes, pins, springs or photoelectric cells. It is also known to provide cards or tapes with cams or analogous protuberances which actuate electric switches of the reader. A drawback common to all such storing devices is that particles of dust, moisture or other foreign matter which accumulate in the holes and/or on the cams often interfere with normal operation of the program devices. Furthermore, scanning by light-sensitive means is expensive and, therefore, not warranted in certain types of program devices.

Accordingly, it is an important object of our invention to provide a simple, compact and relatively inexpensive electrical program device whose operation cannot be affected or disrupted by dust or like minute foreign matter.

Another object of the invention is to provide a novel reader and a novel information storing device which may be utilized in a program device of the above outlined character.

A further object of the invention is to provide a storing device which can be converted to store different types of information and which embodies a safety feature to prevent improper assembly of its parts.

An additional object of the invention is to provide a reader which is capable of temporarily or permanently retaining the information furnished by storing devices in the form of cards or tapes.

SUMMARY OF THE INVENTION

One feature of the present invention resides in the provision of a program device for controlling the operation of programmable working machines or the like. The program device comprises a reader which includes a plurality of signal generating units each of which includes an enclosed magnetizable portion movable from inoperative to operative position in response to magnetization, and a protective envelope accommodating and enclosing such movable portion, and information storing means including one or more permanent magnets supported on a tape-like or card-like carrier and each adapted to be placed into registry with and sufficiently close to one of the envelopes to thereby move the respective magnetizable portion to operative position.

The magnets may be protected from foreign matter by incorporation into strips of synthetic plastic material, and the envelopes are preferably embedded in a layer of plastic material which coats one side of a supporting panel forming part of the reader and serving as a mounting means for the envelopes.

The novel features which are considered as characteristic of the invention are set forth in particular in the appended claims. The improved program device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
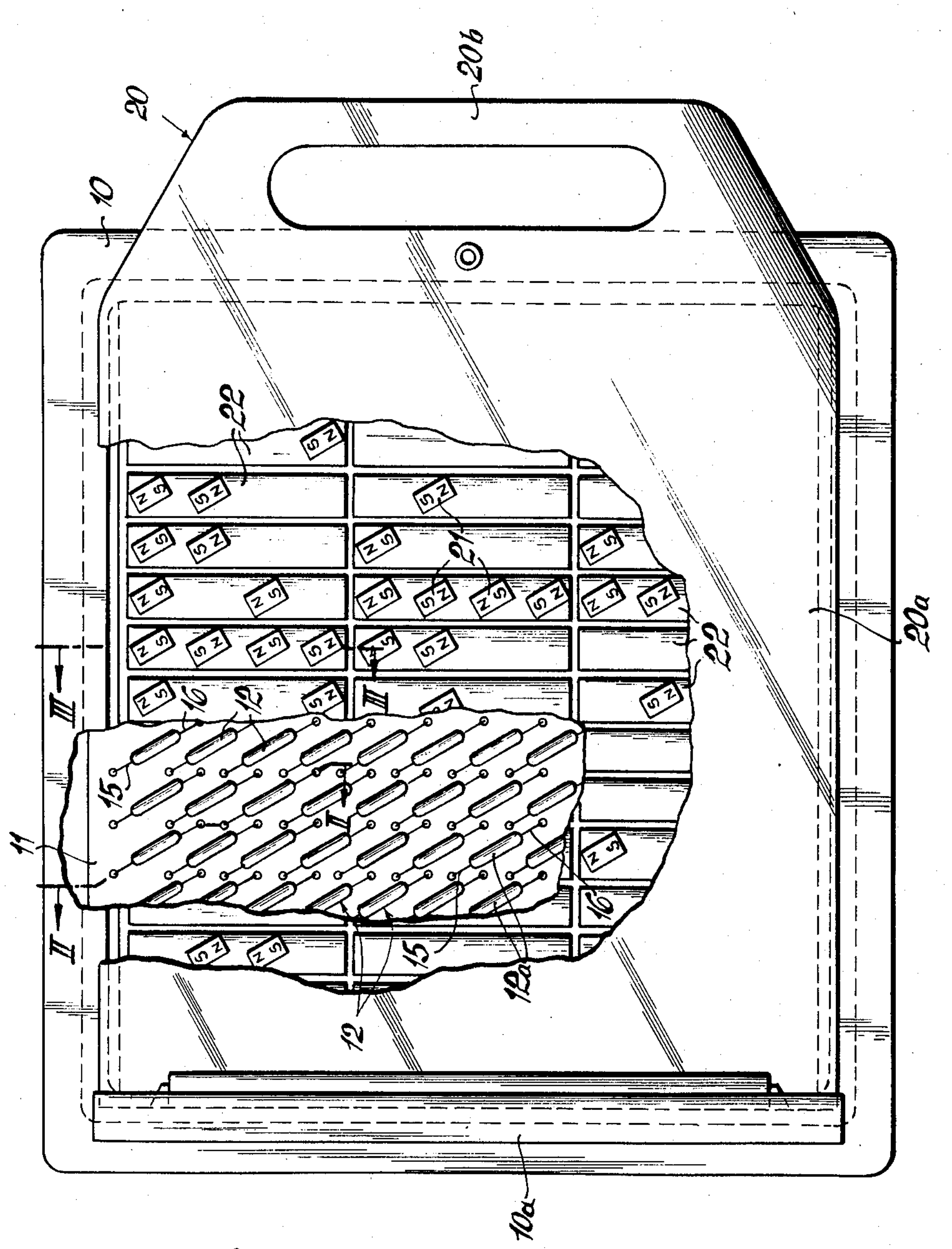
FIG. 1 is an elevational view of a program device which embodies one form of our invention, a portion of the information storing device being partially broken away.
Figure 2:
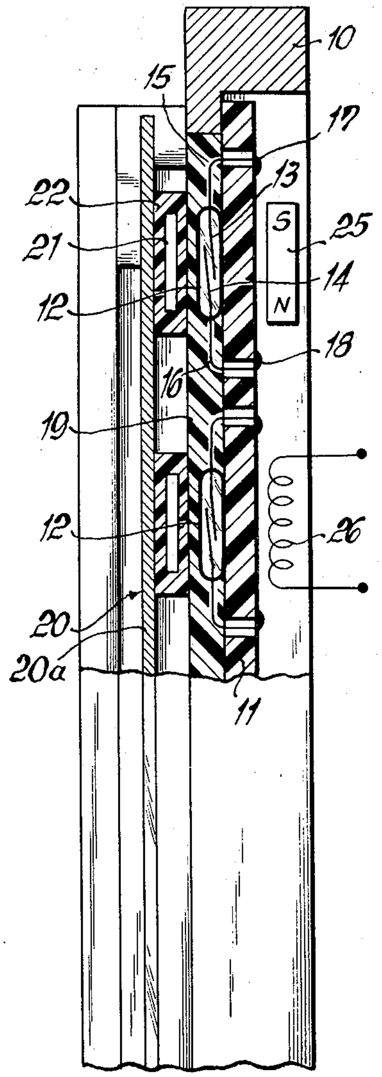
FIG. 2 is an enlarged fragmentary sectional view of the program device, substantially as seen in the direction of arrows from the line II—II of FIG. 1.

FIG. 1 illustrates a program device whose reader comprises a rectangular frame or support 10 for a plate or panel 11 of insulating material. The signal generating units 12 are arranged in several rows adjacent and/or above each other and are mounted on the insulating plate 11 in a manner as shown in FIG. 2. Each signal generating unit 12 comprises an envelope 12*a* of vitreous material containing two overlapping electric contacts 13, 14 at least one of which is movable toward the other when placed into a suitable magnetic field. The contacts 13, 14 constitute two portions of a normally open electric switch. Median portions of these contacts are permanently welded to or otherwise embedded in the material of the envelope 12*a*. The outer portions 15, 16 of the contacts 13, 14 extend through the insulating plate 11 and are provided with terminals 17, 18 located at the righthand side of the plate 11, as viewed in FIG. 1, i.e., opposite the respective envelope 12*a*. All of the envelopes 12*a* are embedded in a layer or coat 19 of synthetic plastic material which adheres to the respective side of the plate 11 and protects the envelopes from dust or other foreign matter.

An information storing device 20 in the form of a card is shown in FIG. 1 adjacent to the layer 19. This sotring device comprises a sheet- or panel-like carrier 20*a* of non-magnetizable material and one side of the carrier 20 supports an array of permanent magnets 21 each of which is adjacent and sufficiently close to one of the envelopes 12*a* when the storing device 20 is properly located with reference to the frame 10. As shown in FIG. 1, the device 20 may be provided with a handle 20*b* for convenient manipulation. The frame 10 has ways 10*a* or analogous locating means for one edge of the carrier 20*a*.

Figure 3:
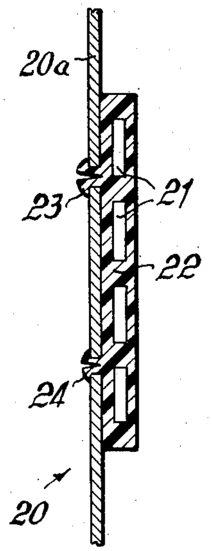
FIG. 3 is an enlarged fragmentary sectional view of the storing device, substantially as seen in the direction of arrows from the line III—III of FIG. 1.

The distribution of permanent magnets 21 on the carrier 20*a* will determine the mode of operation of the machine which is controlled by the program device of our invention. Each permanent magnet 21 will close the switch in the registering enevelope 12*a* by causing the contact 13 to engage the overlapping contact 14, or vice versa, i.e. to move the switch to an operative position. The magnets 21 are assembled into groups each of which comprises several magnets (preferably not more than four). A separate strip-shaped member 22 of synthetic plastic material surrounds each group of magnets (see particularly FIG. 3). Each such strip 22 is provided with two differently dimensioned projections or rivets 23, 24 which constitute coupling means and extend through openings provided in the carrier 20*a*. The projections 23, 24 can be withdrawn from the respective openings in response to deformation so that the groups of magnets 21 may be distributed on the carrier 20*a* in a number of different ways. The array of magnets 21 in each of these groups will determine a certain part of the overall program.

Figure 4:
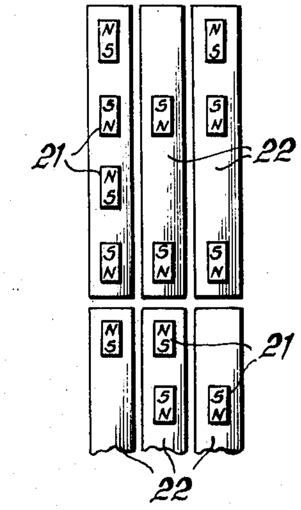
FIG. 4 illustrates a portion of a modified storing device.

The magnets 21 of each group are arranged in the respective strips 22 in such a way that similar poles of adjoining magnets are adjacent to each other (see FIG. 4). The provision of differently dimensioned coupling projections 23, 24 on each strip 22 enables the operators to assemble a storing device 20 in such a way that similar poles of magnets 21 on adjoining strips 22 are adjacent to each other (see FIG. 4). In other words, such differently dimensioned coupling projections 23, 24 constitute a safety device to prevent improper distribution of strips 22 on the carrier 20*a*.

The magnets 21 of a strip 22 may be located in a single file or row (see FIG. 4), or their longitudinal directions may be inclined with reference to the longitudinal direction of the strip (see FIG. 1). The latter mode of assembling the groups of magnets 21 allows for placing of the magnets closer to each other, i.e., the length of strips 22 can be reduced.

The action of permanent magnets 21 upon the switches in the adjoining envelopes 12*a* can be influenced by magnetic auxiliaries which are shown in FIG. 2. Such auxiliaries may include additional permanent magnets 25 and/or exciter coils 26 located at that side of the insulating plate 11 which carries the terminals 17, 18. The magnets 25 and/or coils 26 render it possible to store the information furnished by a card 20 after the card is removed from the frame 10, to "lock" certain information, and/or to furnish the reader with certain information by hand in parallelism with the card 20.

The manner in which the terminals 17, 18 of switches in the envelopes 12*a* are connected with the control system of a programmable machine is well known from the art and need not be shown or described here. Of course, the program device of our invention is normally furnished with two or more storing devices 20 or the permanent magnets 21 on the carrier 20*a* must be rearranged whenever the machine is to operate in accordance with a different program.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. An electrical program device for controlling the operation of programmable machines or the like, comprising a reader including a panel of insulating material and a plurality of signal-generating means each having a magnetizable portion movable from an inoperative position to an operative position in response to magnetization thereof and an envelope sealingly enclosing said magnetizable portion, said plurality of signal-generating means being unformly distributed on said panel in a plurality of lines and columns; information-storing means comprising a card-like carrier of non-magnetizable material and a plurality of permanent magnets carried thereby in adjoining relationship so that each of said magnets can be brought into registry with and sufficiently close to a corresponding signal-generating means to move the magnetizable portion thereof to said operating position, said permanent magnets being arranged so that similar poles of adjacent magnets are adjacent to each other, said plurality of permanent magnets being further arranged in a plurality of groups forming a unit and each including a strip of plastic material in which less than 5 magnets are embedded, said permanent magnets and said signal-generating means having substantially parallel longitudinal axes which are inclined with respect to the longitudinal direction of said columns and lines; and coupling means for detachably securing each of said strips to said carrier, said coupling means being constructed so as to permit securing of the respective strip to said carrier only in a predetermined position.

2. A program device as defined in claim 1, wherein said coupling means comprises differently dimensioned projections provided on each of said strips and complementary openings for said projections provided in said carrier.

3. A program device as defined in claim 1, wherein the magnets of each group are arranged in a single row.

4. A program device as defined in claim 1, wherein the longitudinal directions of magnets in at least one of said groups are inclined with reference to the longitudinal direction of the respective strip.

References Cited

UNITED STATES PATENTS

| | | | |
|---|---|---|---|
| 3,076,878 | 2/1963 | Koda | 335—153 X |
| 3,158,710 | 11/1964 | Paglee | 335—206 |
| 3,233,060 | 2/1966 | Wintriss | 335—207 X |
| 3,320,562 | 5/1967 | Germanton | 335—207 |
| 3,129,302 | 4/1964 | Postel | 335—206 |
| 3,154,761 | 10/1964 | O'Gorman | 335—207 X |
| 3,205,323 | 9/1965 | Deshautreaux | 335—207 |
| 3,249,715 | 5/1966 | Warman | 335—206 X |

OTHER REFERENCES

The Numerical Control of Plate Shears, G. Hardmeier, "Microtecnic"; No. 5, vol. 18, October 1964; pp. 248 and 249.

BERNARD A. GILHEANY, Primary Examiner

R. N. ENVALL, Jr., Assistant Examiner

U.S. Cl. X.R.

335—207, 203